Feb. 6, 1934.   A. W. ADAMS   1,946,262

HOT AIR GUN

Filed Feb. 16, 1932

Inventor
A. W. Adams
by J. Edw. Maybee
ATTY

Patented Feb. 6, 1934

1,946,262

UNITED STATES PATENT OFFICE 1,946,262

HOT AIR GUN

Alexander W. Adams, Lorne Park, Ontario, Canada, assignor to J. C. Adams Company Limited, Toronto, Ontario, Canada Application February 16, 1932. Serial No. 593,405

7 Claims. (Cl. 219—39)

This invention relates to air heating appliances and more particularly to appliances of this character in which air under pressure is heated by an electric heating element, and my object is to provide means for preventing the overheating of the device without increasing the time necessarily required to heat the element. Other objects I have in mind will hereinafter appear.

I attain my objects by connecting a thermostat in the circuit for supplying electric energy to the heating element. Both the element and the thermostat are arranged within the casing of the air gun so that if the temperature of the interior of the casing rises beyond a predetermined point the thermostat will open the circuit in the usual way. The casing is provided with a compartment in which the thermostat is located and this compartment is separate from the heating chamber in which the heating element is located. The air to be heated is directed into the compartment and around the thermostat therein before passing into the heating chamber so that the temperature of the compartment is kept considerably lower than that of the heating chamber while air is being circulated through the gun. Further, if the thermotat has opened the circuit, the temperature of the compartment is lowered quickly to cause the thermostat to close the circuit again immediately a fresh supply of air is passed into the chamber.

Figure 1:
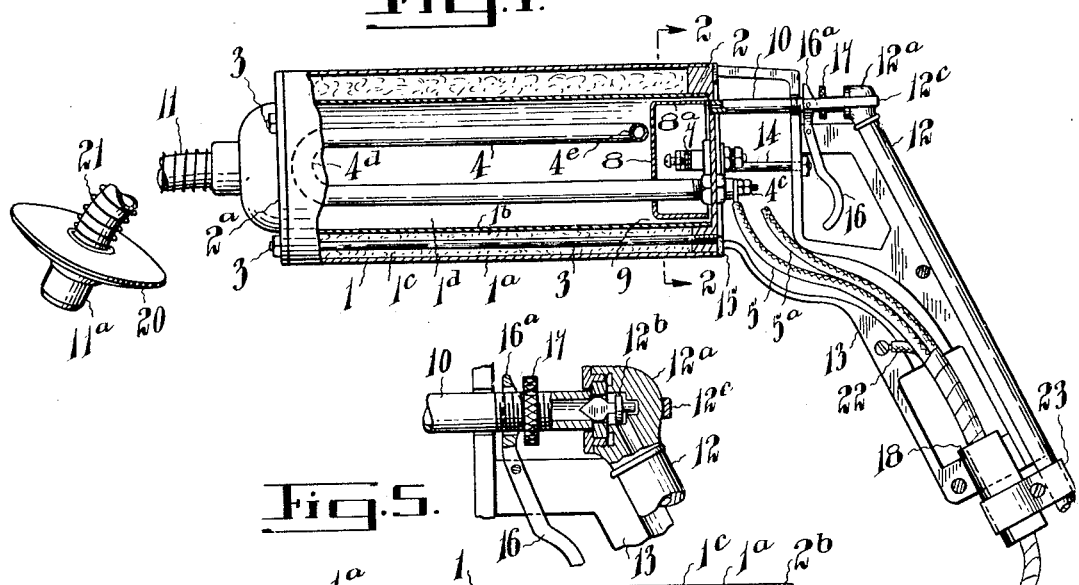
Figures 2, 3, 5:
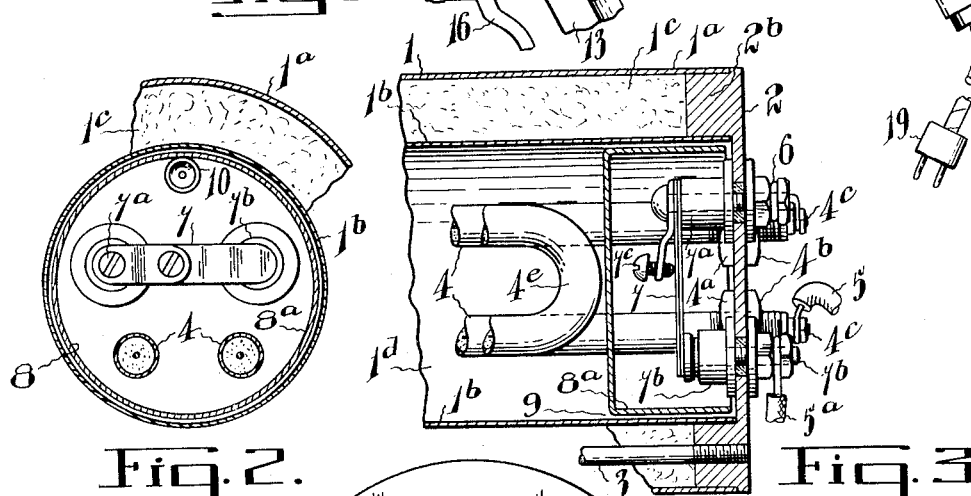
Figure 4:
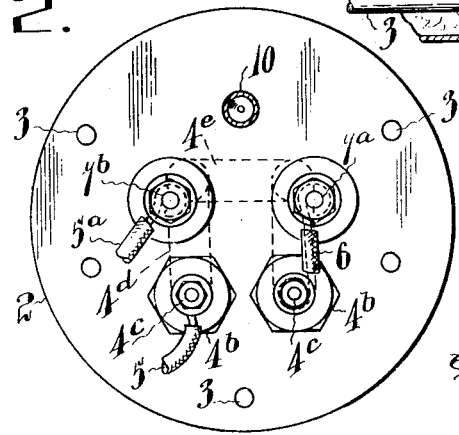

The constructions are hereinafter more fully described and are illustrated in the accompanying drawing in which Fig. 1 is a longitudinal section of my apparatus;

Fig. 2 a cross section thereof on the line 2—2 in Fig. 1;

Fig. 3 a detail in horizontal section on the line 3—3 in Fig. 2;

Fig. 4 a front view of one of the casing ends showing the wiring hook-up; and

Fig. 5 a detail showing the nut for locking the trigger in its operative position.

In the drawing like numerals of reference indicate corresponding parts in the different figures.

1 is a cylindrical casing comprising outer and inner shells $1^a$, $1^b$ which are spaced apart and this space is packed with any suitable heat insulating material $1^c$. The ends 2, $2^a$ of the casing are provided with annular flanges $2^b$ adapted to be received in the annular space between the shells $1^a$, $1^b$ adjacent their ends. Tie rods 3 secured in any suitable manner in the flange $2^b$ of the end 2 extend through the insulating material $1^c$ and the other end $2^a$. Nuts threaded on these projecting ends of the rods 3 hold the parts of the casing together.

An electric heating element 4 encased in a metallic sheath is supported within the casing 1 by securing the free ends of the element to the end 2 of the casing. This may be accomplished by providing the free ends of the element with shoulders $4^a$ adapted to engage the inner side of the end 2 and threading nuts $4^b$ on the outer ends of the element for engagement with the outer side of the end 2. Referring to the drawing it will be noted that the legs of the element extend forwardly, then bend upwardly at $4^d$, and extend rearwardly to the bend $4^e$ where they are joined together. This bend $4^e$ serves a useful purpose which will hereinafter appear.

The free ends of the heating element are provided with terminals $4^c$ located at the outer side of the casing end 2. One of these terminals is connected with a lead wire 5 of an electric supply circuit and the other terminal is connected by a connector 6 with a contact $7^a$ of a thermostat. The thermostat comprises a bimetallic strip 7 having one end secured to the contact $7^a$ and the other end normally electrically connected with a contact $7^b$. The bi-metallic strip 7 is located at the inner side of the end 2 and the contacts $7^a$, $7^b$ project through the said end and are suitably insulated therefrom as are the terminals $4^c$. The contact $7^b$ is connected with the other lead wire $5^a$ of the supply circuit so that current will flow through the heating element 4 when the thermostat completes the circuit therethrough.

A cup 8 having a rim $8^a$ surrounding the bi-metallic strip 7 of the thermostat is disposed on the free legs of the heating element 4. The external diameter of the rim $8^a$ is slightly smaller than the internal diameter of the inner shell $1^b$ in which it is carried, and the depth of the cup is less than the distance between the inner side of the end 2 and the adjacent portion of the bend $4^e$ so that communication will be established between the interior of the cup and the interior of the rest of the casing 1. That is to say the space designated at 9 in Fig. 3 around the edge of the rim $8^a$ and between the latter and the shell $1^b$ will permit any air entering the compartment formed by the cup 8 to eventually pass into the heating chamber $1^d$ in which the main portion of the heating element 4 is located. The end 2 of the casing is provided with an inlet 10 for directing air into the cup which is adapted to direct the air around the bi-metallic strip 7 before it passes through the communication 9 into the heating chamber 1ᵈ. The end 2ᵃ is provided with a nozzle 11 forming an outlet for the heated air.

The gun is particularly adapted for liquefying grease and congealed oil in the differential, gear box, and oil pan of an automobile and will therefore be used chiefly in service stations and garages which are equipped with air supply lines, for inflating pneumatic tires. To enable these installed air supply lines to be used for supplying air to the gun I form the air inlet 10 as a tube adapted to co-act with the usual outlet valve 12ᵇ of a chuck 12ᵃ on the end of an air supply line 12. The free end of the latter is received in a grooved handle 13 secured by bolts 14 to the casing end 2 and insulated therefrom by a ring 15 of heat insulating material. A trigger 16, having a bail shaped member 12ᶜ pivoted thereon for engagement with the rear end of the chuck 12ᵃ, is adapted to move the latter relative to the tube whereby the valve in the chuck will be opened against the air pressure in the line 12 to admit air into the compartment formed by the cup 8.

To releasably lock the trigger in its operative position to hold the chuck valve open I thread a nut 17 on the tube 10 for engagement with the trigger. That is to say the nut is normally out of engagement with the trigger but if the operator desires to hold the valve open for a considerable time he may thread the nut into engagement with the upper end of the trigger which end is bifurcated or provided with a loop 16ᵃ freely embracing the tube 10.

The lead wires 5, 5ᵃ are passed through the handle 13 and through a piece of rubber tubing 18 suitably secured to the end of the handle for distributing the flexing strains on the lead wires which are connected to a plug 19 adapted to be received in an ordinary socket (not shown) connected with a source of electric supply.

From this description it is obvious that the incoming air will maintain the thermostat 7 at a temperature below that of the heating chamber 1ᵈ and that the thermostat may be readily regulated by the adjusting screw 7ᶜ to maintain the heating element circuit closed while air is passing through the device. If the operator cuts off the air supply by removing his finger or the nut 17 from the trigger and forgets to remove the plug 19 from its socket, the thermostat will automatically open the heating element circuit when the temperature in the cup compartment reaches a predetermined point. If this happens and the operator again desires to use the gun it is obvious that the entrance of a fresh supply of air into the cup 8 and thus around the bi-metallic element 7 will quickly cool the latter and cause it to close the circuit whereby the heating element will be quickly conditioned for operation.

To prevent any grease or oil from splashing back on to the operator, a shield 20 is slidably mounted on the nozzle 11, the end of which is provided with a knob 11ᵃ for preventing the shield from sliding off and for engagement with the wall of an opening if it be desired to temporarily support the nozzle. A spring 21 disposed on the nozzle tends to maintain the shield against the knob so that by inserting the knobbed end of the nozzle in an opening the shield will cover the latter.

A wire 22 for grounding the handle in the usual manner is provided. A clamp 23 secured to the tubing 18 is adapted to releasably hold the air line 12 in position on the handle 13.

It is to be distinctly understood that any variations in the device as described may be made without departing from the spirit of my invention.

It is obvious that the gun may be used for discharging other than hot air. Of course it will be also understood that an atomizer may be interposed between the outlet of the heating chamber 1ᵈ and the nozzle 11 in which case a spray of hot air and hot liquid will be discharged through the nozzle 11.

What I claim as my invention is:

1. A hot air gun comprising a chamber having a compartment in communication therewith; an electric heating element arranged within the chamber and connected in a supply circuit; a thermostat located within the compartment adapted to open the circuit when the temperature in the compartment rises above a predetermined point; an air passage leading from the chamber; and an air inlet leading into the compartment and adapted to direct the incoming air around the thermostat before reaching the heating element chamber.

2. A hot air gun comprising a casing having an air inlet and an outlet; an electric heating element arranged in the casing and connected in a supply circuit; a thermostat adapted to open and close the circuit when the temperature of the casing rises and falls above and below a predetermined point respectively, the thermostat being located in the casing adjacent the air inlet; and baffle means between the thermostat and the heating element adapted to direct the incoming air around the thermostat before reaching the heating element.

3. A hot air gun comprising a casing having an air outlet; an electric heating element arranged in the casing and connected in a supply circuit; a thermostat adapted to open and close the circuit when the temperature of the casing rises and falls above and below a predetermined point respectively; a cup surrounding the thermostat and communicating with the casing; and an inlet for directing air into the cup.

4. A hot air gun comprising a casing having an air outlet at one end; a sheathed electric heating element having its ends projecting through the other end of the casing; a thermostat comprising two contacts and a bi-metallic strip, the latter being located within the casing and one of the contacts being electrically connected with one of the said projecting ends; a supply circuit comprising two lead wires, one being connected with the other contact and the other wire being connected with the other projecting end; a cup disposed on the projecting end and located within the casing, the rim of the cup surrounding the thermostat and having an external diameter smaller than the adjacent internal diameter of the casing to establish communication between the cup and casing; and an air inlet directed into the cup.

5. A hot air gun comprising a casing having an air inlet tube adapted to co-act with the outlet valve of a chuck on the end of an air line normally used for supplying air to pneumatic tires; means for moving the chuck relative to the tube to open the valve; an electric heating element arranged within the casing; a thermostat arranged within the casing for controlling the supply of energy to the heating element; and means for directing the incoming air from the tube around the thermostat.

6. An air gun comprising a casing having an air inlet tube adapted to co-act with the outlet valve of a chuck on the end of an air supply line normally used for inflating pneumatic tires; means for moving the chuck relative to the tube to open the valve comprising a manually operable trigger and a member connected therewith for engaging chuck; and means for releasably locking the trigger in its operative position to hold the valve open.

7. A hot air gun comprising a casing having an air inlet and an outlet spaced from the inlet; an electric heating element arranged in the casing between the inlet and outlet and connected in a supply circuit; and a thermostat adapted to open and close the circuit when the temperature of the air in the casing rises and falls above and below a predetermined point respectively, the thermostat being located adjacent the air inlet in the path of the air from the inlet to the outlet so that the incoming air contacts with the thermostat before it reaches the heating element.

ALEXANDER W. ADAMS.